United States Patent [19]
Kerfoot et al.

[11] 3,849,701
[45] Nov. 19, 1974

[54] INTEGRATED DUAL VOLTAGE POWER SUPPLY

[75] Inventors: Charles S. Kerfoot, Baltimore; Frank A. Halgas, Laurel, both of Md.

[73] Assignee: Westinghouse Electric Corporation, Pittsburgh, Pa.

[22] Filed: May 16, 1973

[21] Appl. No.: 360,993

[52] U.S. Cl. .................... 315/101, 315/3.5, 330/43, 331/82
[51] Int. Cl. ...................... H05b 39/00, H05b 41/14
[58] Field of Search ......... 315/3.5, 70, 101; 330/43; 331/82

[56] References Cited
UNITED STATES PATENTS

| | | | |
|---|---|---|---|
| 2,611,832 | 9/1952 | Lapostolle | 330/43 |
| 3,165,696 | 1/1965 | Poole | 330/43 X |
| 3,573,536 | 4/1971 | Palmer | 315/3.5 |
| 3,697,799 | 10/1972 | Caldwell et al. | 315/3.5 |
| 3,723,798 | 3/1973 | O'Brien | 315/3.5 |
| 3,737,713 | 6/1973 | Kalish | 315/3.5 |

Primary Examiner—James W. Lawrence
Assistant Examiner—Saxfield Chatmon, Jr.
Attorney, Agent, or Firm—D. Schron

[57] ABSTRACT

The disclosure relates to a power supply circuit for supplying two d.c. voltages to a linear beam device and, more specifically, to a power supply circuit for providing body and collector potentials to a traveling wave tube. The power supply circuit includes a transformer winding having a plurality of taps for providing two a.c. output voltages. The a.c. output voltage across the entire winding is applied to a full wave rectifying circuit to supply a first d.c. output voltage required for operation of the tube. A rectifier such as a diode is operatively connected to each tap to provide, in association with the full wave rectifying circuit, a second d.c. output voltage required for operation of the tube. Only one main transformer is required in the disclosed power supply arrangement and, because the full wave rectifying circuit diodes are shared by the two d.c. supplies, fewer rectifiers are required than in prior art arrangements. Moreover, filtering may be accomplished by a single filter in the full wave rectifying circuit.

7 Claims, 4 Drawing Figures

INTEGRATED DUAL VOLTAGE POWER SUPPLY

BACKGROUND OF THE INVENTION

1. Field of the Invention

The present invention relates to a power supply for high power tubes and, more particularly, to an integrated power supply for linear beam devices such as traveling wave tubes in which a single main transformer and filter network are utilized to supply power both to a first element and a second element of the traveling wave tube.

2. State of the Prior Art

In the highly sophisticated radar systems such as pulsed Doppler systems presently in use, transmitter coherency, bandwidth and stability requirements are typically very stringent due to the signal processing requirements of the radar system. Appropriately controlled linear beam devices, particularly traveling wave tubes, can typically fulfill the coherency, bandwidth and stability requirements and thus the development of systems employing traveling wave tubes has progressed rapidly over the last several years.

An initial step in improving the efficiency of traveling wave tube transmitter systems was the separation of the beam current of the tube into body and collector currents. This separation permitted the use of two power supplies, one for the collector circuit and one for the body circuit. The power supplies thus could be treated separately for the purposes of filtering and regulation.

Since the stability of the collector voltage has little effect upon the stability of the signal from the traveling wave tube, regulation of this voltage is not required and very limited filtering is required. Thus, while the regulation and filtering of the body supply voltage is usually necessary to meet stability requirements, the separation of body and collector supplies permits the use of greatly reduced component values and ratings and thus greatly reduces size, weight and cost.

The use of two independent power supplies, however, still necessitates two rather large power supplies, each of which is referenced to the cathode of the traveling wave tube, one spanning the cathode voltage and the other 60% of the cathode voltage. For example, a typical traveling wave tube power supply arrangement may provide a body supply voltage of 40 kv and a collector supply voltage of 24 kv.

To further reduce the power supply size, weight and cost, it was recognized that the collector and body power supplies could be connected in series with a resultant decrease in the output voltage required of the body power supply. With the collector supply in series with the body supply, the regulator for the body supply must still respond to and offset the voltage changes of the collector supply due to load and line changes. However, the overall series connected circuit permits the use of components having lower voltage rating requirements, particularly in the body supply, and thus the body supply and filter could be reduced in size, weight and cost.

However, even with the advancement to the series connected collector and body power supplies, certain disadvantages remain. For example, in both the independent and series connected power supply systems discussed above, two separate input transformers, full wave rectifying circuits and filter networks are required. The required transformers, as well as the choke coils required in the rectifying circuits and filter networks, are not only heavy and space consuming items, but also add considerably to the cost of the traveling wave tube power supply.

It is accordingly an object of the present invention to minimize the size, weight and cost of power supplies for linear beam devices and, more specifically, to provide a novel integrated power supply for supplying both the body and collector voltages to a traveling wave tube, the novel power supply eliminating the requirement of two individual transformers, two full wave rectifying circuits and two filter networks.

SUMMARY OF THE INVENTION

These and other objects and advantages are accomplished in accordance with the present invention in which a transformer winding and contact or tap means operatively connected thereto are adapted to supply a.c. voltages of appropriate values for producing two d.c. voltages required for operation of a high power linear beam device such as a traveling wave tube.

The transformer winding is provided with output terminals adjacent the ends of the winding and the output terminals are operatively connected to a full wave rectifying circuit. The full wave rectifying circuit is adapted for electrical connection to the linear beam device, preferably through a filtering circuit and a regulator, to provide one d.c. output voltage to the linear beam device. A plurality of rectifiers such as semiconductor diodes are each operatively connected in like polarity to an associated one of the tap means and to a common terminal to provide, in association with the full wave rectifying circuit, the second d.c. output voltage required for operation of the linear beam device.

In a preferred embodiment of the invention, the linear beam device is a traveling wave tube having a body, collector and cathode. The full wave rectifying circuit is adapted for electrical connection to the body and cathode of the tube, preferably through a filter network, to supply body current. The common terminal to which the rectifiers are operatively connected is adapted for electrical connection to the collector and cathode of the tube to supply collector current. With the power supply circuit connected to the traveling wave tube in this manner, collector and body current both flow through the filter and the full wave rectifying circuit. The need for separate body supply and collector supply filtering, as well as the need for a full wave rectifying circuit in the portion of the circuit supplying collector current, is thereby eliminated. Moreover, a single transformer may be utilized to supply both voltages.

DETAILED DESCRIPTION

Figure 1:
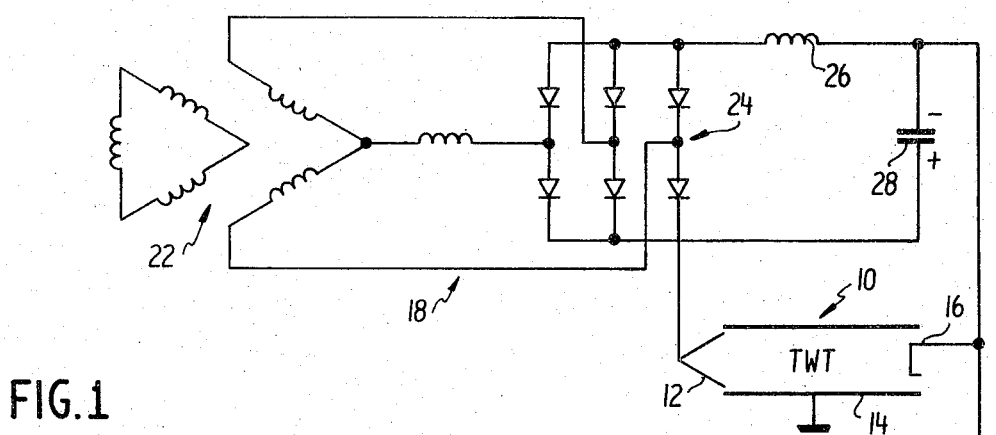
FIG. 1 is a schematic circuit diagram illustrating one prior art linear beam device power supply arrangement.

FIG. 1 illustrates one prior art power supply arrangement for supplying collector voltage and body voltage to a linear beam device such as a traveling wave tube generally indicated at 10. As is shown in FIG. 1, the traveling wave tube 10 typically includes three main tube elements 12, 14 and 16 generally referred to as the collector (12), the body (14) and the cathode (16). In the illustrated arrangement, the collector 12-cathode 16 voltage or potential is supplied from a first power supply generally indicated at 18 and the body 14-cathode 16 voltage or potential is supplied from a second, independent power supply 20. The collector voltage may be, for example, on the order of 15 kv and the body voltage may be, for example, on the order of 25 kv.

In the illustrated three-phase embodiment of FIG. 1, the collector supply 18 generally includes a conventional three-phase transformer 22, a conventional three-phase full wave rectifier 24, and a conventional LC filter comprising an inductor or choke coil 26 and a capacitor 28. The filtered output voltage from the power supply 18 is coupled to the traveling wave tube 10 with the positive output terminal connected to the collector 12 and the negative output terminal connected to the cathode 16 as illustrated.

The body power supply 20 generally includes a conventional three-phase transformer 30, a conventional three-phase full wave rectifier 32, a conventional LC filter comprising an inductor or choke coil 34 and a capacitor 36 and a suitable conventional voltage regulator 38. The filtered and regulated output voltage from the power supply 20 is typically supplied to the traveling wave tube 10 by connecting the negative output terminal of the power supply 20 to the cathode 16 and by grounding both the positive output terminal of the power supply 20 and the body 14 of the tube 10.

The operation of the circuit of FIG. 1 is entirely conventional and requires no further description. It should, however, be noted that the collector and body power supplies 18 and 20 are totally independent. Thus, it will be appreciated by one skilled in the art that two rather large supplies with relatively high voltage components are required.

Figure 2:
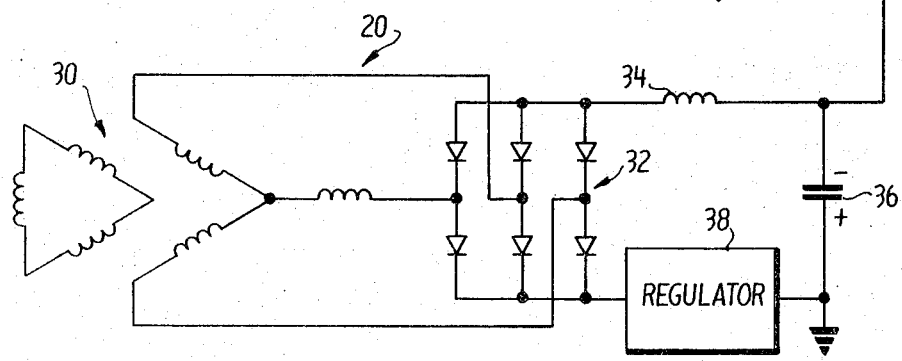
FIG. 2 is a schematic circuit diagram illustrating another prior art linear beam device power supply arrangement.
Figure 2:
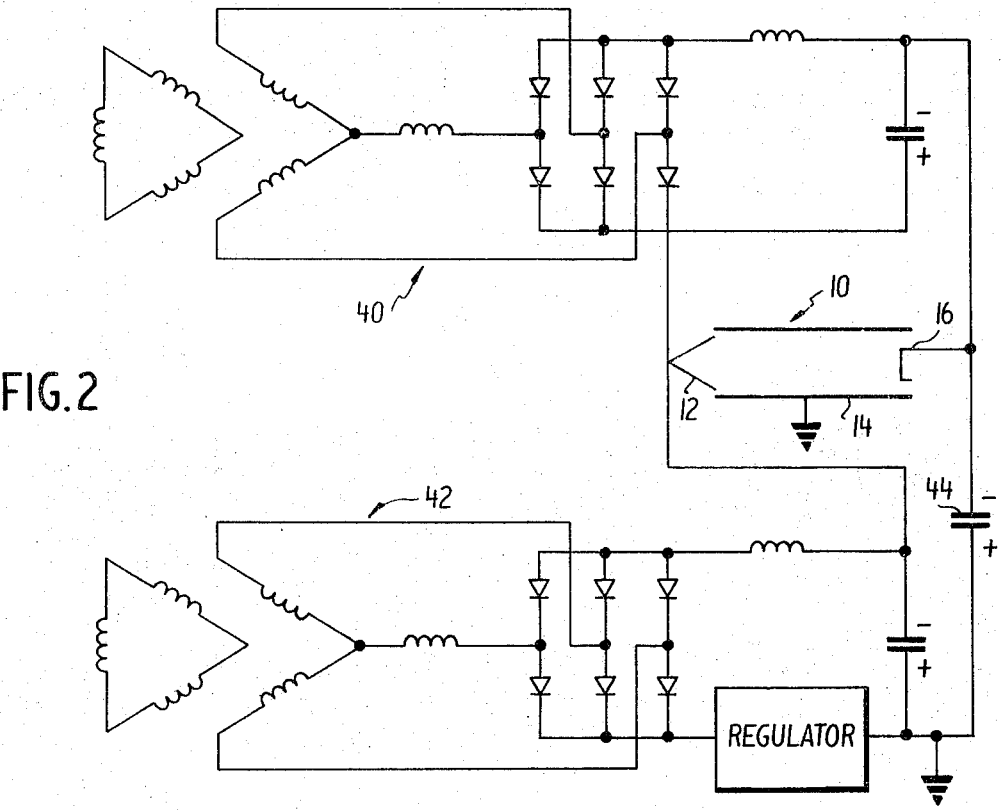

In FIG. 2 there is illustrated another prior art power supply arrangement for linear beam devices wherein the supplies are connected in series and thus can be reduced somewhat in size, weight and cost. Referring to FIG. 2, a power supply 40, substantially identical to the power supply 18 of FIG. 1 (and thus not described in detail), may supply the collector 12-cathode 16 potential to the traveling wave tube 10. Assuming that the same type of traveling wave tube as was described in connection with FIG. 1 is utilized in the circuit of FIG. 2, the power supply 40 may supply a filtered voltage of 15 kv between the collector and cathode with the positive side of the power supply connected to the collector 12 and the negative side of the power supply connected to the cathode 16.

To reduce the output voltage required of the body supply, a power supply 42 substantially identical in circuit configuration to the power supply 20 of FIG. 1 (and thus not described in detail) may be provided. It should be noted, however, that the power supply 42 is connected in series with the power supply 40 in the FIG. 2 embodiment and thus the output voltage requirement of the power supply 42 is reduced by the value of the output voltage of the power supply 40. Thus, the output voltage required of the power supply 42 may be on the order of 10 kv in the specific example wherein a 25 kv body voltage is required for proper operation of the traveling wave tube 10.

To provide the required body voltage, the negative output terminal of the power supply 42 is connected to the collector 12 (and thus to the positive output terminal of the power supply 40), and the positive output terminal of the power supply 42 is grounded. If the tube 10 is pulsed as in a pulsed Doppler radar system, an energy storage capacitor 44 rated at the combined output voltage of the two power supplies 40 and 42, e.g., rated at 25 kv, may be connected between the positive output terminal of the body supply 42 (i.e., ground) and the negative output terminal of the collector supply 40.

It can be seen from the FIG. 2 power supply arrangement that the collector voltage, i.e., the potential between the collector 12 and the cathode 16, is supplied from the collector supply 40 substantially independently of the power supply 42. The body potential applied between the body 14 and the cathode 16 is, however, supplied from both the power supply 40 and the power supply 42. The power supply 42 thus may be designed to provide a much lower output voltage than that of the power supply 20 of FIG. 1. Of course, since the power supplies 40 and 42 are in series, the regulator in the power supply 42 must respond both to the fluctuations in the voltage from the power supply 42 and the fluctuations in the output voltage from the power supply 40. Moreover, each power supply must include a filtering network and a full wave rectifying circuit.

It will be appreciated that while the arrangement of FIG. 2 is an improvement over that of FIG. 1, two transformers, two full wave rectifiers and two filtering networks are required by the traveling wave tube 10. The necessity of these components results in significant size, weight and cost requirements.

In accordance with the present invention, the two potentials required by the traveling wave tube 10 are supplied without the need for one transformer, one filter and certain of the diodes in one full wave rectifier circuit of the prior art power supply arrangements. To facilitate an understanding of the present invention, a two-phase embodiment and a three-phase embodiment of the invention are hereinafter described in detail in connection with FIGS. 3 and 4, respectively.

Figure 3:
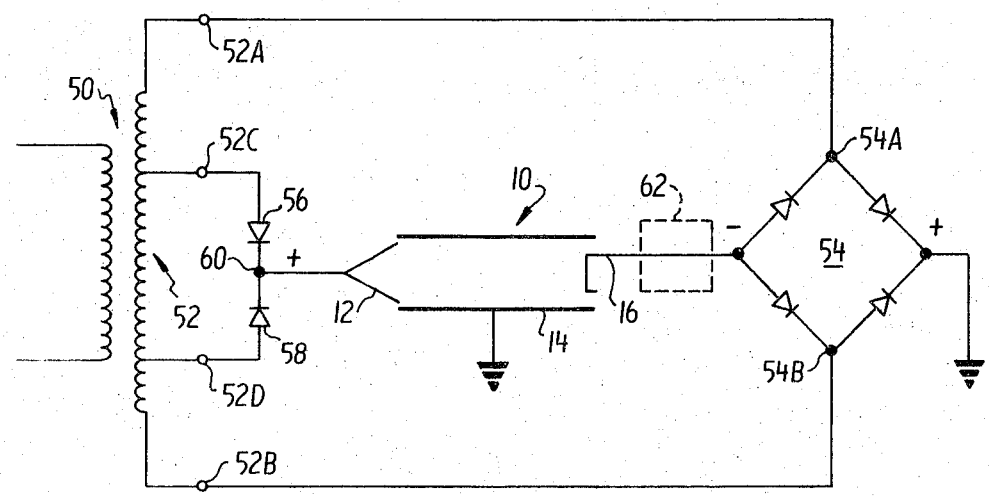
FIG. 3 is a schematic circuit diagram illustrating one embodiment of the power supply arrangement of the present invention; and, FIG. 4 is a schematic circuit diagram illustrating another embodiment of the power supply of the present invention.

Referring now to FIG. 3, a two-phase transformer generally indicated at 50 provides a desired a.c. voltage between the ends 52A and 52B of a secondary winding 52. The secondary winding 52 may be provided with taps 52C and 52D at appropriate locations therealong as is hereinafter described in greater detail. The a.c. voltage between the terminals 52A and 52B, i.e., the voltage across the entire transformer in the illustrated embodiment, will hereinafter be referred to as a line-to-line voltage VLL. The a.c. voltage between the taps 52C and 52C, i.e., the voltage across a portion of the transformer winding 52 in phase with and less than the voltage VLL, will hereinafter be referred to as the tap-to-tap voltage VTT. Similarly, the voltages between either terminal 52A or 52B and the respective taps 52D and 52C will hereinafter be reffered to as the tap-to-line voltages VTL.

In the embodiment illustrated in FIG. 3, the terminals 52A and 52B of the transformer winding 52 may be connected to input terminals 54A and 54B of a full wave rectifying circuit 54 such as a full wave diode bridge circuit. The negative output terminal of the full wave rectifying circuit 54 may be connected to the cathode 16 of the traveling wave tube 10 and the positive output terminal may be grounded. The body 14 of the traveling wave tube 10 may also be grounded so that the d.c. output voltage from the full wave rectifying circuit 54 is effectively applied between the body 14 and the cathode 16.

The taps 52C and 52D along the winding 52 may be connected to the anode electrodes of respective diodes 56 and 58, the cathode electrodes of which may be connected at a common junction or terminal 60. The diodes 56 and 58 are thus connected between the respective taps 52C and 52D and the common terminal 60 in like polarity. The junction 60 may be connected to the collector 12 of the traveling wave tube 10 to thereby supply a d.c. potential between the collector 12 and the cathode 16 as will hereinafter be more fully described.

In operation, the entire a.c. voltage across the transformer winding 52 is rectified by the full wave rectifier 54 and the d.c. output voltage from the rectifier 54 may be applied to the cathode 16 and the body 14 of the traveling wave tube 10. The cathode 16 is thus negative with respect to the body 14 by a potential related to the line-to-line voltage VLL. Assuming, for example, that appropriate filtering is provided between the negative output terminal of the full wave rectifying circuit 54 and the cathode 16 as is indicated in phantom at 62, the cathode 16-body 14 potential will approximately correspond to the peak value of the line-to-line voltage VLL.

In addition, the diodes 56 and 58 will alternately conduct applying a positive potential to the collector 12. This positive potential applied to the collector 12 is not referenced to ground but rather is referenced to one or the other of the terminals 52A and 52B of the winding 52 depending upon which diode is conducting. For example, during one-half cycle the diode 56 will conduct and apply a positive potential to the collector 12. The resultant current flow path when the diode 56 conducts is from tap 52C through the diode 56 to the junction 60, from the collector 12 to the cathode 16, from the cathode 16 through the appropriately poled diode in the rectifying circuit 54 to the terminal 54B and to the terminal 52B of the winding 52. The potential between the collector 12 and the cathode 16 is thus related in value to the tap-to-line voltage VTL, i.e., the voltage between the tap 52C and the terminal 52B of the winding 52. Similarly, it can be seen that the collector 12-cathode 16 potential during the next half cycle depends upon the voltage VTL between the tap 52D and the terminal 52A.

The operation of the circuit of FIG. 3 may be more clearly understood with reference to a specific example. Assuming that the traveling wave tube 10 requires a body supply voltage of 25 kv, the transformer 50 may be appropriately designed to supply the a.c. voltage VLL required by the full wave rectifier to produce 25 kv d.c. potential between the body and the cathode 16.

To facilitate the description, it may be assumed that the required a.c. voltage VLL is 25 kv.

Assuming that a collector supply voltage of 15 kv d.c. is required and again assuming a direct one-to-one relationship between a.c. and d.c. supply voltages, the taps 52C and 52D may be located along the winding 52 so as to provide equal tap-to-line voltages of 15 kv a.c. The tap 52C may thus be located 3N/5 turns from the output terminal 52B where N is the total number of turns of the winding 52. Similarly, the tap 52D may be located 3N/5 turns from the output terminal 52A. A balanced a.c. voltage VTL, i.e., an a.c. voltage equal in peak amplitude on each half cycle, is thereby provided.

It will be apparent to one skilled in the art that both body and collector current flow through the full wave rectifying circuit 54. This "sharing" of diodes in the rectifying circuit 54 permits the use of only two diodes in addition to the diodes in the full wave rectifying circuit 54 to full wave rectify the tap-to-line voltages VTL. Moreover, filtering can be effectively accomplished utilizing only one filter circuit as indicated at 62. Regulation of the body voltage may be provided in any suitable manner, and energy storage capacitors for operation in a pulsed Doppler system or the like may be appropriately added to the circuit.

Figure 4:
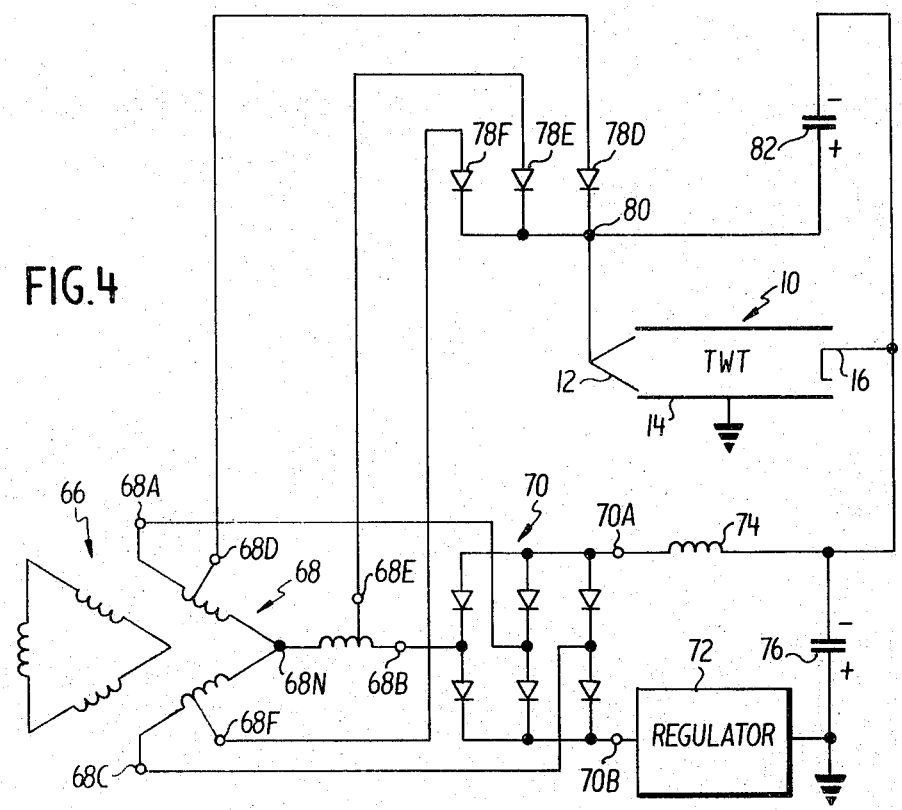

A three-phase embodiment of the power supply of the present invention is illustrated in FIG. 4. Referring now to FIG. 4, a three-phase transformer 66 having a Y-connected secondary or output winding 68 may be provided with output terminals 68A, 68B and 68C. The winding 68 may be provided with a plurality of taps 68D, 68E and 68F and the transformer winding neutral may be designated 68N.

The output terminals 68A, 68B and 68C of the winding 68 may be operatively connected to a full wave rectifying circuit 70 such as a full wave diode bridge comprising a pair of semiconductor diodes for each phase. The full wave rectifying circuit 70 may be electrically connected to the cathode 16 and the body 14 of the traveling wave tube 10 preferably through a regulator 72 and a filtering network comprising an inductor 74 and a capacitor 76. In the embodiment illustrated in FIG. 4, the negative output terminal 70A of the rectifying circuit 70 is operatively connected through the inductor 74 to the cathode 16 and the positive output terminal 70B is operatively connected through the regulator 72 to the body 14 with the capacitor 76 effectively connected between the cathode 16 and the body 14. This arrangement thus provides a filtered and regulated body potential for operation of the traveling wave tube 10.

Each of the taps 68D, 68E and 68F is connected through an associated diode 78D, 78E and 78F, respectively, to a common terminal 80. The common terminal 80 may be adapted for electrical connection to the collector 12 of the traveling wave tube 10, and the terminal 80 may be connected through an energy storage capacitor 82 to the cathode 16 of the traveling wave tube 10 if required for proper operation of the tube 10 as in, for example, a pulsed mode.

In operation, line-to-line voltages VLL across the output terminals 68A-68B, 68A-68C and 68B-68C are full wave rectified by the rectifying circuit 70 to provide a body supply voltage at the terminals 70A and 70B. In a radar system in which the transmitter coherency, bandwidth and stability requirements are stringent, the body supply voltage at the terminal 70A and 70B may be filtered and regulated and then applied to the body 14 and cathode 16 of the traveling wave tube 10. The component values and transformer output voltages may be selected in any suitable conventional manner to provide, for example, the required 25 kv body potential.

For example, the required line-to-neutral voltage VLN and thus the required line-to-line voltage VLL may be calculated for a particular d.c. body potential $V_B$ as follows:

VLN = (.428)($V_B$)
VLL = $\sqrt{3}$ VLN

The collector 12-cathode 16 potential is provided by the rectifiers 78D, 78E and 78F in association with the respective taps 68D, 68E and 68F and in conjunction with the full wave rectifying circuit 70. The location of the taps 68D, 68E and 68F for a particular d.c. collector voltage may be calculated from the previously calculated required line-to-line voltage VLL.

For example, the tap-to-line voltage VTL for a particular d.c. collector voltage $V_C$ may be calculated as follows:

VTL = (.428)($\sqrt{3}$)($V_C$)

Since the actual a.c. voltage rectified by the rectifiers 78D, 78E and 78F, in association with full wave rectifying circuits 70, is greater than the tap-to-tap voltage VTT by an amount depending upon the location of the taps, the tap locations may be specified in relation to the neutral point 68N of the winding 68 as the tap-to-neutral or VTN voltage as follows:

cos 30° (VTN) = VTL−cos 30° (VLN)
VTN = (VTL−cos 30° (VLN))/(cos 30°)

It can be seen from the above that in the three-phase embodiment of FIG. 4 as in the embodiment of FIG. 3, both body and collector voltage flow through the filtering circuit comprising the inductor 74 and capacitor 76 as well as through the full wave rectifying circuit 70. Thus, in addition to requiring only one transformer, the power supply circuits of both FIGS. 3 and 4 require fewer rectifiers and one less filter than the prior art power supply circuits described in connection with FIGS. 1 and 2. It is estimated that the three-phase embodiment of FIG. 4 may reduce the size and weight of radar transmitters by about 30% and significantly reduce their complexity.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A power supply circuit for supplying two supply voltages to a high power linear beam device comprising:
    a transformer winding having an output terminal adjacent each end thereof and a plurality of taps equally spaced from said output terminals;
    a full wave rectifying circuit operatively connected to said output terminals and adapted for electrical connection to the linear beam device for providing a first d.c. output voltage to the linear beam device; and,
    a plurality of rectifiers each operatively connected in like polarity to an associated one of said plurality of taps and to a common terminal,
    said common terminal being adapted for electrical connection to the linear beam device to provide, in association with said rectifying circuit, a second d.c. output voltage.

2. The power supply circuit of claim 1 wherein the linear beam device comprises a traveling wave tube having a body, a collector and a cathode, said full wave rectifying circuit being adapted for electrical connection to said cathode and said body and said common terminal being adapted for electrical connection to said collector, whereby body current and collector current both flow through said rectifying circuit with the power supply circuit electrically connected to the traveling wave tube.

3. The power supply circuit of claim 1 wherein said transformer winding comprises a secondary winding of a three-phase wye connected transformer, said taps and rectifiers being three in number.

4. The power supply circuit of claim 1 including filter means for filtering rectified d.c. voltage, said full wave rectifying means being adapted for electrical connection to the linear beam device through said filter means, said filter means being operative to filter both said first and second d.c. output voltages with the power supply circuit connected to the linear beam device.

5. The power supply circuit of claim 1 wherein the linear beam device comprises a traveling wave tube having a body, a collector and a cathode, said full wave rectifying means being adapted for electrical connection to said cathode and said body through said filter means and said common terminal being adapted for electrical connection to said cathode and said collector, whereby body current and collector current both flow through said filter means and said rectifying means with the power supply circuit electrically connected to the traveling wave tube.

6. The power supply circuit of claim 5 wherein said transformer winding comprises a secondary winding of a three-phase wye connected transformer, said taps and rectifiers being three in number.

7. A power supply circuit for supplying two d.c. potentials to first and second tube elements each referenced to a third tube element, said power supply circuit comprising:
    a transformer winding for providing a first a.c. voltage;
    first means operatively connected to said transformer winding for providing, between a first and second output terminal, a second a.c. voltage in phase with and of a lesser amplitude than said first a.c. voltage;

means for full wave rectifying said first a.c. voltage to provide a first d.c. voltage between third and fourth output termainsl:
    first and second rectifiers each having an anode electrode and a cathode electrode, one of said electrodes of said first rectifier being operatively connected to said first output terminal of said first means and the like of one of said electrodes of said second rectifier being operatively connected to said second output terminal of said first means;

first circuit means for operatively connecting the remaining like electrodes of said first and second rectifiers to one of the first and second tube elements; and, second circuit means for operatively connecting said third and fourth output terminals respectively to the other of the first and second tube elements and to the third tube element, whereby the power supply circuit is operable to supply a first d.c. potential between said other of said tube elements and said third tube element in response to said first a.c. voltage and is operable to supply a second d.c. potential between said one of said tube elements and said third tube element in response to said second a.c. voltage and a portion of said first a.c. voltage.

* * * * *